(12) United States Patent
Chang et al.

(10) Patent No.: US 9,209,448 B2
(45) Date of Patent: Dec. 8, 2015

(54) CONDUCTIVE CONNECTION STRUCTURE FOR SECONDARY BATTERIES

(75) Inventors: Tsun-Yu Chang, Taichung (TW);
Chun-Chieh Chang, Taichung (TW);
Ting-Keng Lin, Taichung (TW)

(73) Assignee: Changs Ascending Enterprise Co., Ltd., Taichung (TW)

( * ) Notice: Subject to any disclaimer, the term of this patent is extended or adjusted under 35 U.S.C. 154(b) by 288 days.

(21) Appl. No.: 13/701,841

(22) PCT Filed: Sep. 16, 2011

(86) PCT No.: PCT/CN2011/079739
§ 371 (c)(1),
(2), (4) Date: Mar. 11, 2013

(87) PCT Pub. No.: WO2013/037124
PCT Pub. Date: Mar. 21, 2013

(65) Prior Publication Data
US 2014/0220406 A1    Aug. 7, 2014

(51) Int. Cl.
*H01M 2/22* (2006.01)
*H01M 2/20* (2006.01)
*H01M 2/30* (2006.01)
*H01M 2/26* (2006.01)

(52) U.S. Cl.
CPC .............. *H01M 2/206* (2013.01); *H01M 2/266* (2013.01); *H01M 2/22* (2013.01); *H01M 2/30* (2013.01)

(58) Field of Classification Search
CPC ....... H01M 2/226; H01M 2/206; H01M 2/22; H01M 2/30
USPC ................. 429/121, 161, 181, 153; 29/623.2, 29/623.5, 843; 439/627
See application file for complete search history.

(56) References Cited

U.S. PATENT DOCUMENTS

| | | | | |
|---|---|---|---|---|
| 2,404,126 | A | * | 7/1946 | Duddy ....................... 206/524.2 |
| 2,539,873 | A | * | 1/1951 | Steinhoff ...................... 29/623.2 |
| 6,106,973 | A | * | 8/2000 | Sonozaki et al. ............. 429/162 |
| 2003/0036311 | A1 | * | 2/2003 | Benson et al. ................ 439/627 |
| 2009/0111010 | A1 | * | 4/2009 | Okada et al. .................. 429/120 |
| 2010/0081041 | A1 | * | 4/2010 | Okada et al. .................... 429/82 |
| 2010/0216007 | A1 | * | 8/2010 | Kane et al. .................... 429/153 |
| 2011/0076553 | A1 | * | 3/2011 | Kameda et al. ............... 429/181 |
| 2011/0091763 | A1 | * | 4/2011 | Park et al. ..................... 429/158 |

FOREIGN PATENT DOCUMENTS

| | | |
|---|---|---|
| CN | 200962441 Y | 10/2007 |
| CN | 101593820 A | 12/2009 |
| CN | 101877413 A | 11/2010 |

* cited by examiner

*Primary Examiner* — Kenneth Douyette
(74) *Attorney, Agent, or Firm* — Muncy, Geissler, Olds & Lowe, P.C.

(57) ABSTRACT

A conductive connection structure for secondary batteries employs conductive portions disposed under two lateral sides of a cover plate to conductively connect to at least one battery cell. The conductive portions disposed under the two lateral sides of the cover plate are bendable, and the conductive portions are bent toward outer sides of the cover plate, so that the conductive portions are disposed horizontally; a connecting portion is extended upward respectively from an anode and a cathode terminals on two lateral sides of each of the battery cells, and the connecting portions and the conductive portions are electrically connected. By modifying the design of the connection structure of the battery cells and the two conductive portions under the cover plate, a time for soldering the battery cells and the conductive portions for conductive connection is reduced, the connection is tighter and more reliable and manpower cost is reduced.

3 Claims, 6 Drawing Sheets

CONDUCTIVE CONNECTION STRUCTURE FOR SECONDARY BATTERIES

BACKGROUND OF THE INVENTION

1. Field of Invention

The present invention relates to a conductive connection structure for secondary batteries and more particularly to a connection structure for battery cells and an anode terminal or a cathode terminal on a battery cover plate inside a secondary battery.

2. Related Art

Because of breakthroughs in materials technology for lithium batteries, secondary batteries have become a power supplies source (e.g. lithium iron phosphate oxide) for devices which require large electricity consumption such as electric bikes and electric wheelchairs. The power storage quantity and power supply quantity of non-aqueous electrolytic secondary lithium batteries are larger than those of conventional lithium battery.

Referring to FIG. 1, it shows a conventional high capacity rectangular secondary battery, which comprises a plurality of battery cells 10 (three battery cells 10 are shown in the figure for an example). Each of the battery cells 10 is composed of an anode layer, a separating layer and a cathode layer superimposed together, and an anode terminal 11 and a cathode terminal 12 are respectively disposed on two lateral sides of each of the battery cells 10. The battery cells 10 are electrically connected to two conductive portions 21, 22 disposed under two lateral sides of a cover plate 20 via the anode terminal and the cathode terminal 11, 12. In addition, the conductive portions 21, 22 penetrate through the cover plate 20 and electrically connect to electrodes 31, 32 on the cover plate 20 respectively, so as to form a conductive connection structure for external conductive connections. Lastly, the battery cells 10 are placed inside a casing 40 made of metals, then the cover plate 20 and the casing 40 are combined and sealed around the edges thereof by various sealing means, as a result, the rectangular secondary battery is manufactured.

However, in an internal structure of the conventional secondary battery, the conductive portions 21, 22 under the cover plate 20 are disposed vertically to a bottom surface of the cover plate 20, and the battery cells 10 are soldered or connected with the conductive portions 21, 22 via the anode terminals 11 and the cathode terminals 12 which are also disposed vertically to the surface of the cover plate 20. Therefore, the conductive portions 21, 22 need to be structurally matched with a quantity of the battery cells 10; three battery cells 10 shown in the figure are used as an example, that means there are three conductive portions 21, 22 at two lateral sides of the battery cells 10 respectively; therefore, each of the battery cells 10 needs to be soldered or connected to the conductive portions 21, 22 one by one, via the anode terminals 11 and the cathode terminals 12. However, the soldering or connecting process is not only labor and time consuming, but it is difficult for the anode terminals 11/the cathode terminals 12 and the conductive portions 21, 22 to have a tighten electrical connection, which could be rather troublesome for smooth assembling.

SUMMARY OF THE INVENTION

In order to tackle the abovementioned drawbacks, an objective of the present invention is to provide a conductive connection structure for secondary batteries, by modifying the design of the connection structure of the battery cells and the two conductive portions under the cover plate, the problems of time and labor consuming for soldering are solved, therefore practical requirements can be met.

Another objective of the present invention is to provide a conductive connection structure for secondary batteries, by modifying the design of the connection structure of the battery cells and the two conductive portions under the cover plate, so that the anode terminals/the cathode terminals and the conductive portions can have a tighten electrical connection, and the assembling process is made easier.

In order to achieve the abovementioned objectives, the present invention discloses a conductive connection structure applied to secondary battery cells for electrically connecting the conductive portions disposed under two lateral sides of a cover plate with at least one battery cell. The conductive portions disposed under the two lateral sides of the cover plate are bendable, and the conductive portions are bent toward outer sides of the cover plate, so that the conductive portions are disposed horizontally; and a connecting portion is extended upward respectively from an anode terminal and a cathode terminal at two lateral sides of each of the battery cells, so that the connecting portions and the conductive portions are electrically connected together.

The connecting portions at the two lateral sides of each of the battery cells are connected to the anode terminals and the cathode terminals via bent portions respectively for adjusting the contact areas between the connecting portions and the conductive portions. Preferably, it has maximum contacting areas between the connecting portions and the conductive portions for forming largest electrical contacting areas.

Wherein, a number of the conductive portions under the two lateral sides of the cover plate is the same as a number of the anode terminals and the cathode terminals; or the conductive portions under the two lateral sides of the cover plate have large areas for electrically connecting with the entire anode and cathode terminals.

Wherein, after the connecting portions are electrically connected to the conductive portions, the conductive portions are then adjusted vertically to a bottom surface of the cover plate.

The advantages of the present invention lie in that, the conductive portions under the two lateral sides of the cover plate are disposed horizontally, and the connecting portions are respectively extended upward from the anode terminals and the cathode terminals at the two lateral sides of each of the battery cells, so that the electrical connection between the connecting portions and the conductive portions can be done horizontally and laterally. By modifying the design of the connection structure of the battery cells and the two conductive portions under the cover plate, the time for soldering the battery cells and the conductive portions, and manpower cost are reduced. In addition, by the connection method for the connecting portions and the conductive portions of the present invention, the electrical contacts between each of the battery cells and the conductive portions are tighter and more reliable.

DETAILED DESCRIPTION OF THE INVENTION

The structure and the technical means adopted by the present invention to achieve the above and other objectives can be best understood by referring to the following detailed description of the preferred embodiment and the accompanying drawings, but should not be construed as limitations thereof.

Figure 1:
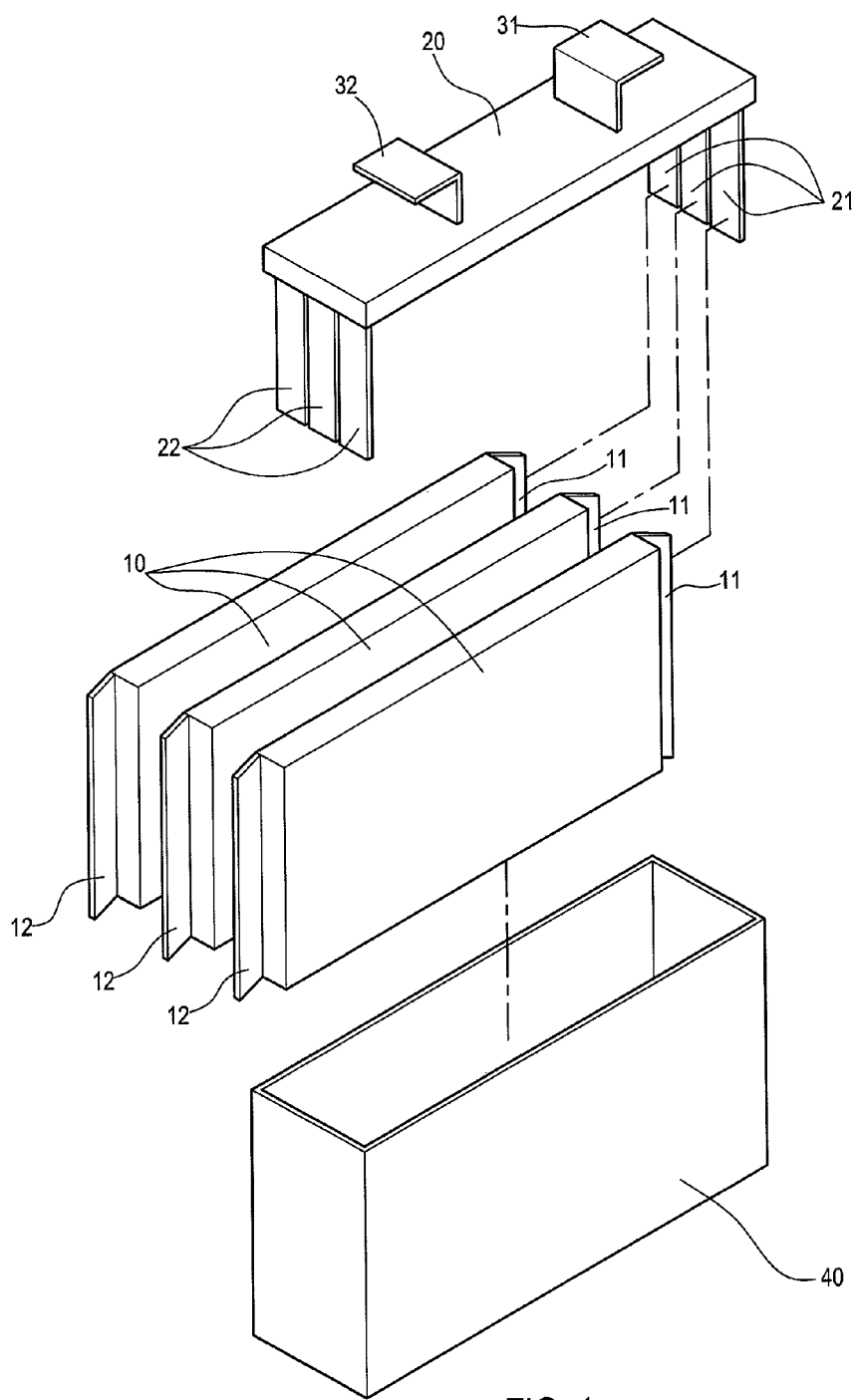
FIG. 1 is an exploded perspective view of a secondary battery.
Figure 2:
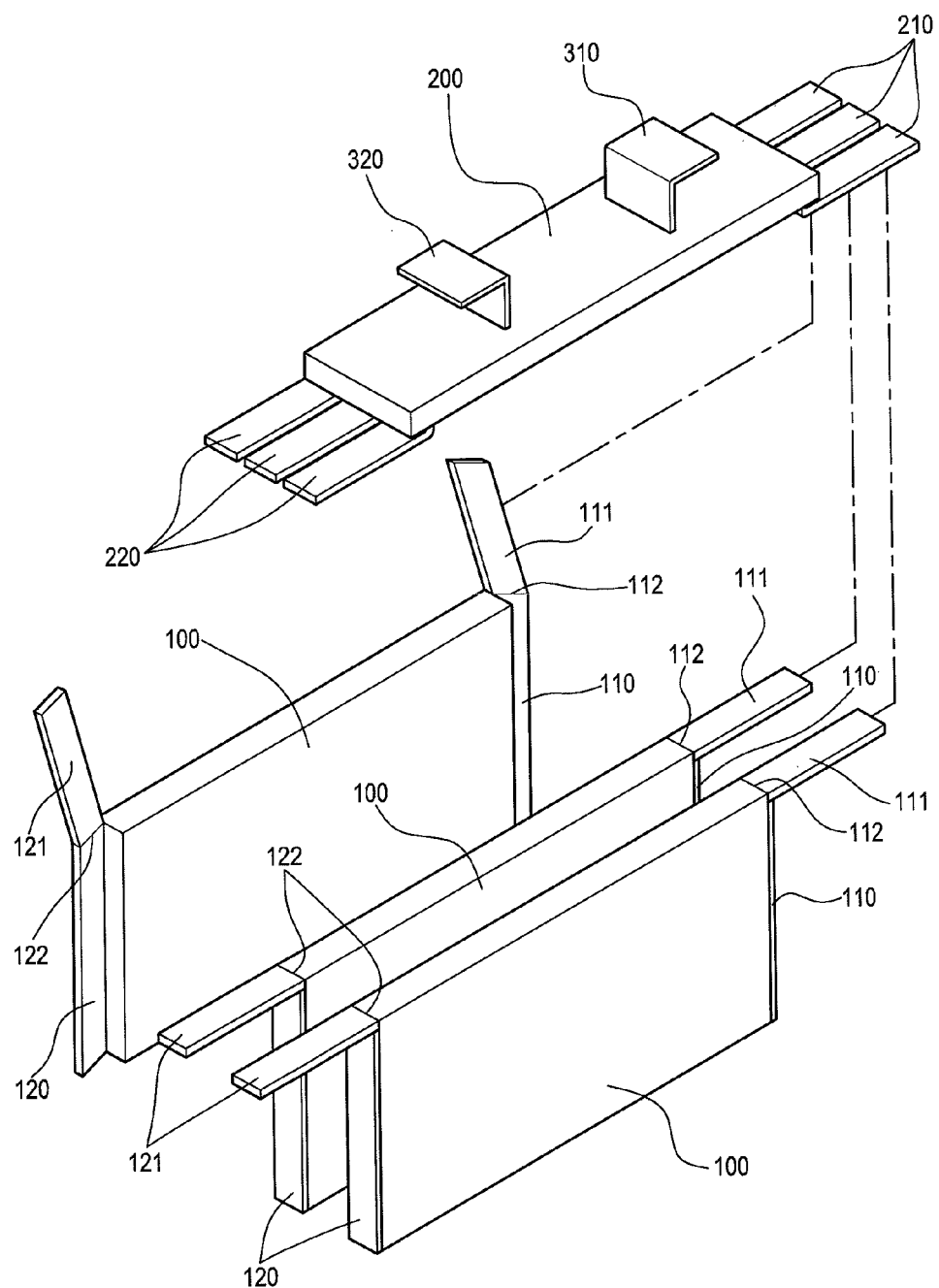
FIG. 2 is an exploded structural view of battery cells and a cover plate of the present invention.
Figure 3:
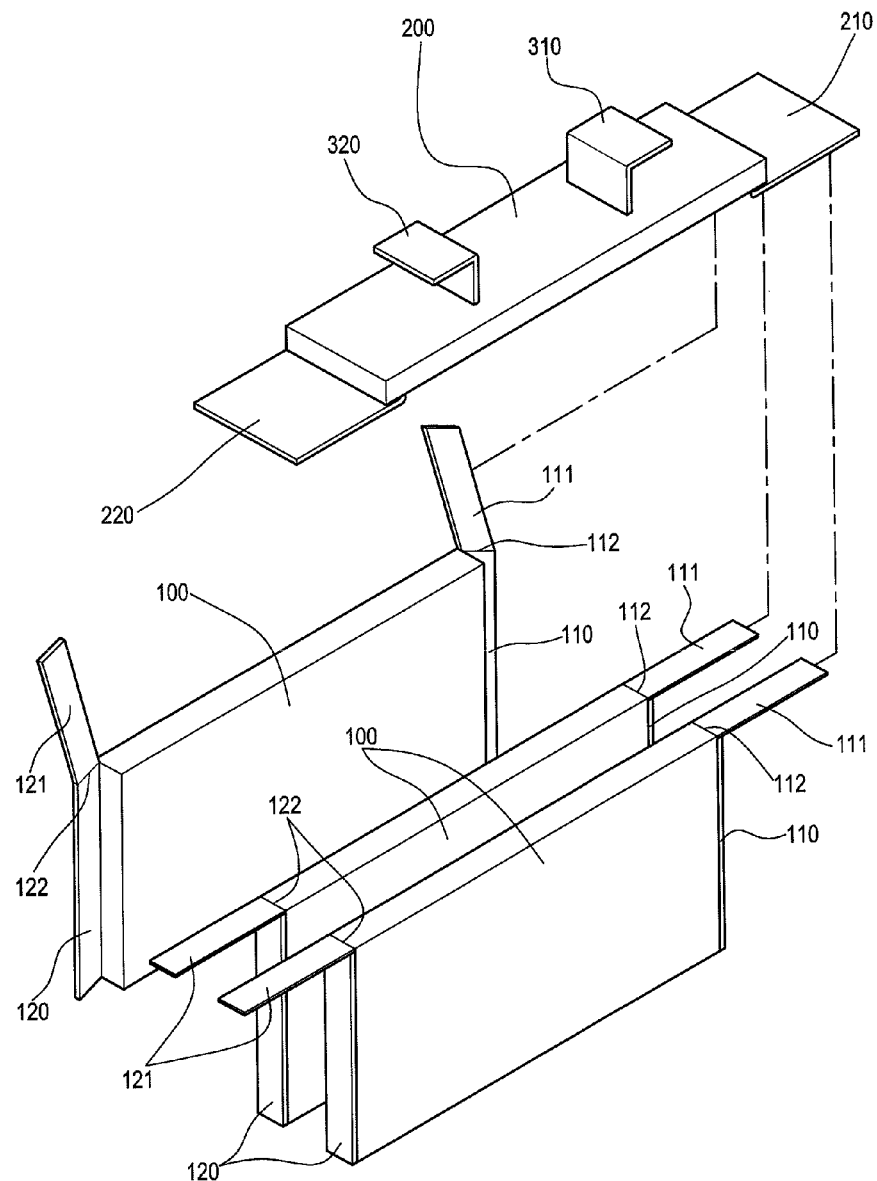
FIG. 3 is another exploded structural view of battery cells and a cover plate of the present invention.

Referring to FIGS. 2 and 3, they show structures of battery cells and a cover plate of the present, the present invention provides a conductive connection structure for secondary batteries, and a rectangular secondary lithium battery is used as an example. The present technique is mainly applied to secondary batteries in which conductive portions 210, 220 disposed under two lateral sides of a cover plate 200 are conductively connect with at least one battery cell 100 (three battery cells 100 are shown in the figures as an example). Each of the battery cells 100 is composed of an anode layer, an insulating layer and a cathode layer superimposed together. An anode terminal 110 and a cathode terminal 120 are respectively disposed at two lateral sides of each of the battery cells 100, and connecting portions 111, 121 are respectively extended upward from the anode terminal 110 and the cathode terminal 120 at the two lateral sides of each of the battery cells 100. In addition, the conductive portions 210, 220 disposed under the two lateral sides of the cover plate 200 are bendable, and the conductive portions 201, 220 are bent toward outer sides of the cover plate 200, so that the conductive portions 210, 220 are disposed horizontally. In one embodiment, by electrical contacts between the connecting portions 111, 121 and the conductive portions 210, 220, the battery cells 100 and the conductive portions 210, 220 disposed under the two lateral sides of the cover plate 200 are electrically connected, and the conductive portions 210, 220 penetrates through the cover plate 200 to connect electrically with electrode terminals 310, 320 disposed on the cover plate 200 respectively, so that a conductive connection structure for external conductive connections is formed.

The connecting portions 111, 121 at the two lateral sides of each of the battery cells 100 are made of extremely thin metal sheet such as copper or aluminum and bent portions 112, 122 are formed between the connecting portions 111, 121 and the anode terminals 110/the cathode terminals 120 respectively, such that contacts between the connecting portions 111, 121 and the conductive portions 210, 220 of the cover plate 200 may be adjusted by the bent portions 112, 122. Preferably, the connecting portions 111, 121 have a length which can provide a largest area to contact with the conductive portions 210, 220. The battery cells 100 and the conductive portions 210, 220 of the cover plate 200 can be adjusted according to design, so that they have largest possible contacting areas for electrical connections, thus a resistance of the electrical contacting surfaces between the battery cells 100 and the conductive portions 210, 220 can be reduced, and a charging and a discharging efficiency of the battery cells 100 can be enhanced.

In practice, the battery cells 100 are electrically connected to the conductive portions 210 and 220 of the cover plate 200, and a number of the conductive portions 210 and 220 disposed under the two lateral sides of the cover plate 200 can be the same as a number of the anode terminals 110 and the cathode terminals 120 as shown in FIG. 2. Preferably, the areas of the conductive portions 210, 220 are the same as the areas of the connecting portions 111, 121, so that largest possible electrical contacting areas are provided. Or the conductive portions 210, 220 disposed under the two lateral sides of the cover plate 200 have large areas for electrically connecting with the entire anode terminal 110 and cathode terminal 120 as shown in FIG. 3. Such a large area structure of the conductive portions 210, 220 makes a soldering or connecting process for the electrical contacts between the connecting portions 111, 121 and the conductive portions 210, 220 more convenient, and largest possible electrical contacting areas are enabled for the electrical connection between the battery cells 100 and the conductive portions 210, 220 of the cover plate 200, and the electrical contacts between each of the battery cells 100 and the conductive portions 210, 220 are tighter and more reliable.

Figure 4:
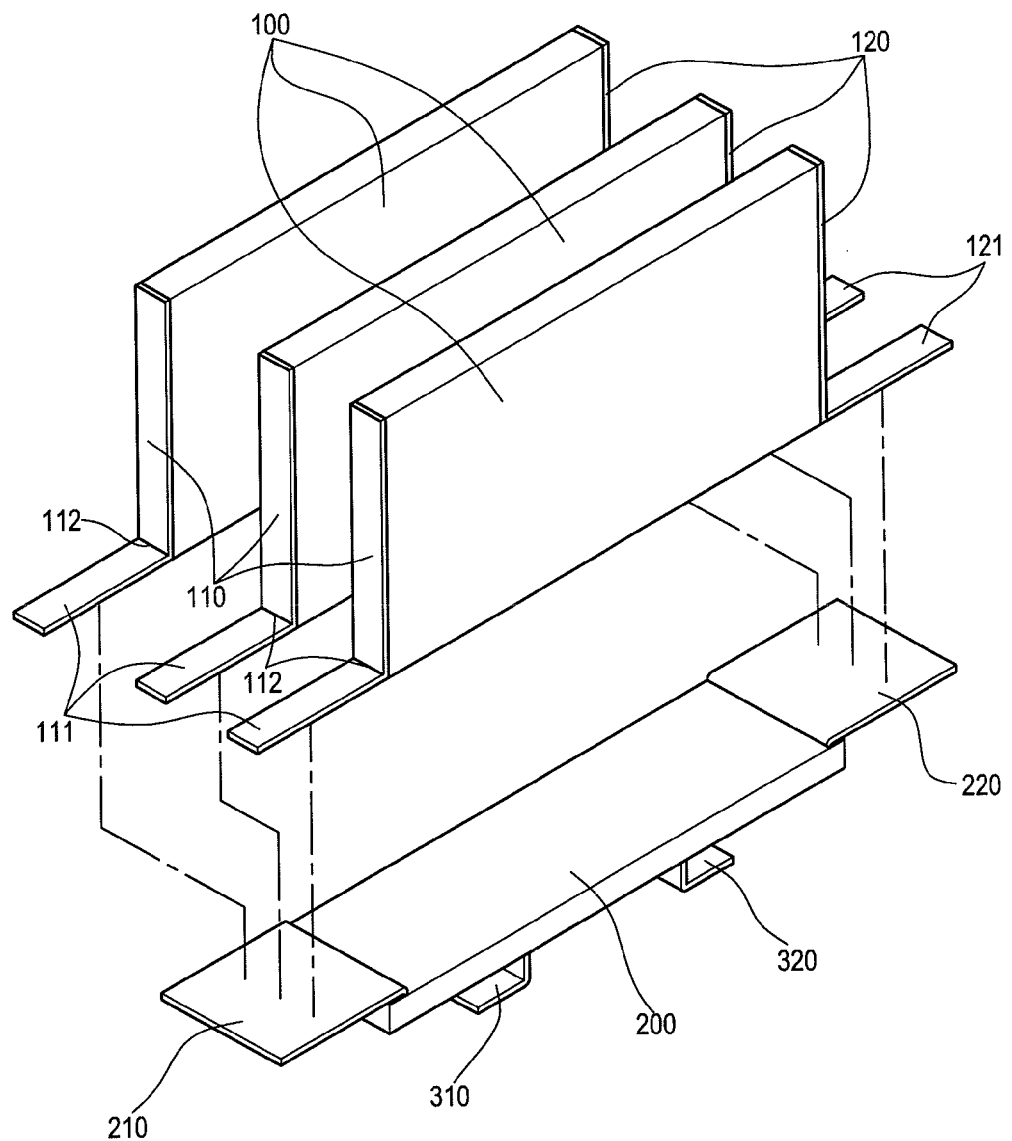
FIG. 4 is an assembling illustration of battery cells and a cover plate of the present invention.
Figure 5:
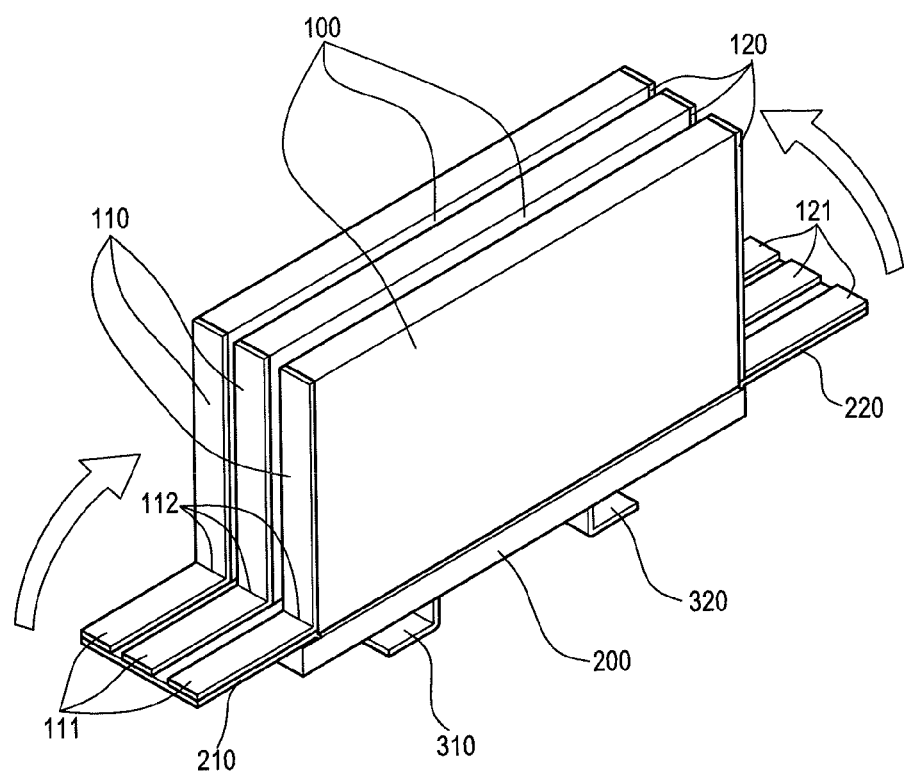
FIG. 5 is an adjustment illustration of conductive portions of a cover plate of the present invention.

Referring to FIG. 4, in one embodiment of the preset invention, the cover plate 200 may be disposed on a reverse side so that electrical connecting surfaces of the conductive portions 210, 220 are faced upward, and each of the battery cells 100 is disposed facing downward; then the connecting portions 111, 121 are placed directly on the surfaces of the conductive portions 210, 220 (the conductive portions 210, 220 with a single and large area structure are used as an example), and they are soldered or adhered with the conductive portions 210, 220 respectively. After the connecting portions 111, 121 and the conductive portions 210, 220 are electrically connected together, the conductive portions 210, 220 are then bent to be disposed vertically to a bottom surface of the cover plate 200 as shown in FIG. 5.

Figure 6:
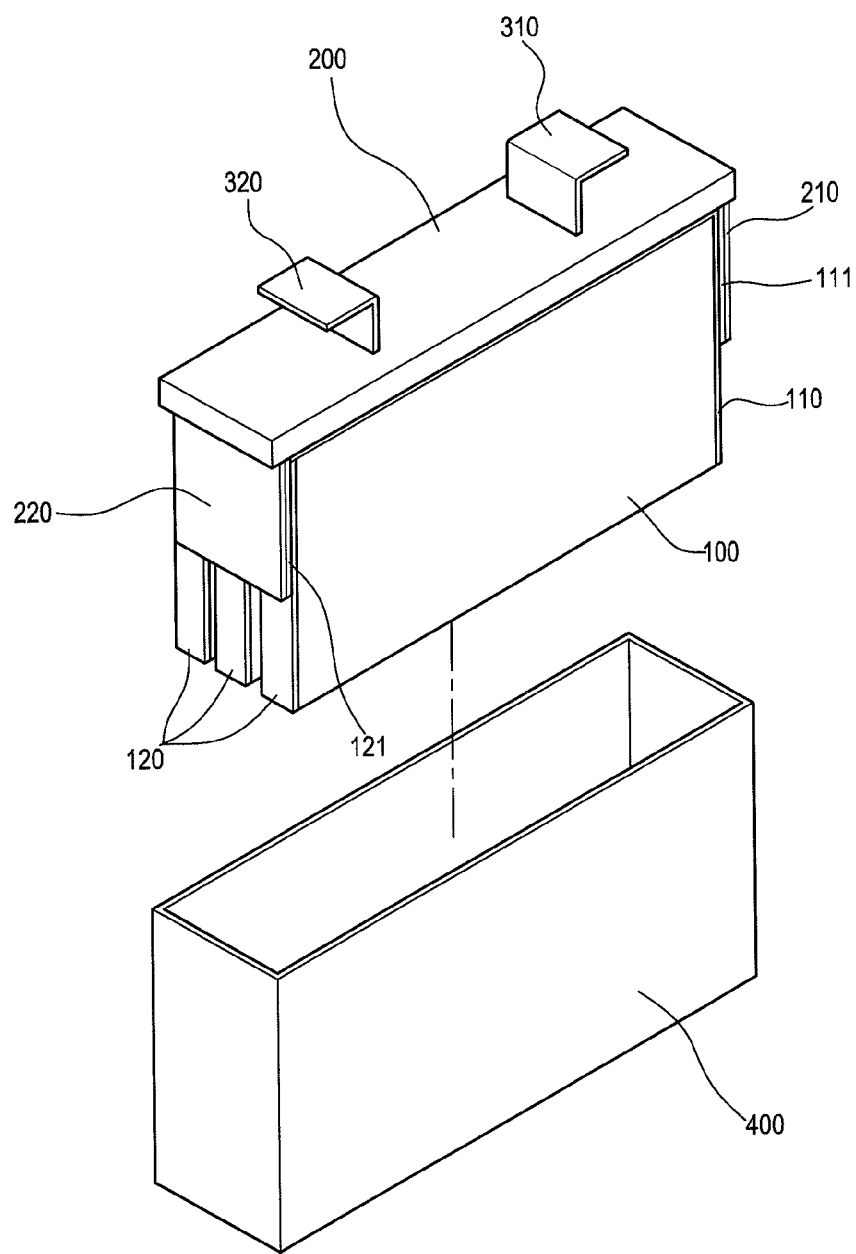
FIG. 6 is an assembling illustration of a secondary battery of the present invention.

Referring to FIG. 6, lastly, the battery cells 100 are placed inside a metal casing 400, the cover plate 200 is placed on an opening of the casing 400, then edges of the cover plate 200 and the casing 400 are combined and sealed by various sealing means, as a result, the secondary battery is manufactured.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A conductive connection structure for secondary batteries employing conductive portions disposed under two lateral sides of a cover plate to conductively connect with at least one battery cell, characterized in that:
    the conductive portions disposed under the two lateral sides of the cover plate are bendable, and the conductive portions are bent toward outer sides of the cover plate, so that the conductive portions are disposed horizontally; and
    a connecting portion is bendable and extended horizontally respectively from an anode terminal and a cathode terminal at two lateral sides of each of the battery cells, and the connecting portions and the conductive portions are electrically connected together, wherein after the connecting portion and the conductive portion are electrically connected, the connecting portion and the conductive portion are bent to be vertical with the cover plate at the same time, so as to make the connecting portion, the conductive portion, the anode terminal or the cathode terminal overlap with each other, and maximize an electrically contacting area between the connecting portion, the conductive portion, and the anode terminal or the cathode terminal.

2. The conductive connection structure for secondary batteries as claimed in claim 1, wherein the connecting portions at the two lateral sides of each of the battery cells are connected to the anode terminals and the cathode terminals via bent portions respectively.

3. The conductive connection structure for secondary batteries as claimed in claim 1, wherein a number of the conductive portions under the two lateral sides of the cover plate is the same as a number of the anode terminals and the cathode terminals.

\* \* \* \* \*